Oct. 9, 1951 J. G. LIBOIRON 2,570,573
SELF-PROPELLED IRRIGATION MACHINE
Filed Jan. 23, 1950 3 Sheets-Sheet 1

INVENTOR
JOSEPH GEORGES LIBOIRON
BY
AGENT

Oct. 9, 1951      J. G. LIBOIRON      2,570,573
SELF-PROPELLED IRRIGATION MACHINE

Filed Jan. 23, 1950      3 Sheets-Sheet 2

INVENTOR
JOSEPH GEORGES LIBOIRON
BY

AGENT

INVENTOR
JOSEPH GEORGES LIBOIRON
BY

AGENT

Patented Oct. 9, 1951

2,570,573

UNITED STATES PATENT OFFICE 2,570,573

SELF-PROPELLED IRRIGATION MACHINE

Joseph Georges Liboiron, Medicine Hat, Alberta, Canada

Application January 23, 1950, Serial No. 140,113
In Canada October 13, 1949

1 Claim. (Cl. 299—53)

This invention relates to a machine used for field irrigation consisting of a motor driven vehicle on which are mounted means of spraying water to a certain distance on each side thereof and on the ground covered by the vehicle itself as it goes along.

In sections of flat prairies, it is absolutely necessary that the ground be sprayed, particularly in sections more subject to drought with consequent heavy losses to crops. Therefore, I have constructed a machine with which fairly large areas of land can be successfully watered with little expense to the owner and in less time than with the sprinklers now in use; and the objects of my improvement are, first, to provide sprinkling arrangement of parts mounted on a motor vehicle; second, to provide means of regulating the velocity of the water in the sprinkler's feeding conduits and to synchronize it with the speed of the machine due to the arrangement of clutches on the vehicle easily accessible to the driver; and third, to provide a sprinkling machine which can be put together and dismantled in a short time and the vehicle used for other purposes.

I attain these objects by mechanism illustrated in the accompanying drawings in which—

Figure 1:
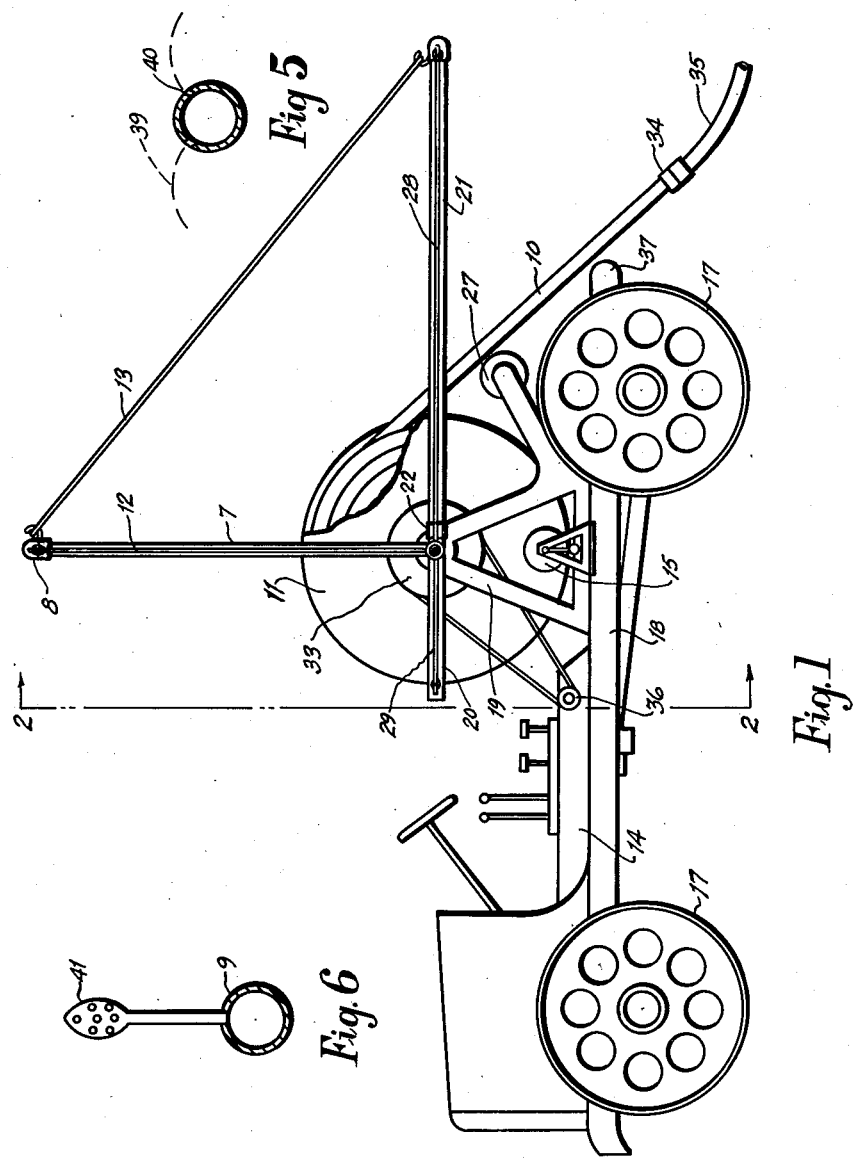
Figure 2:
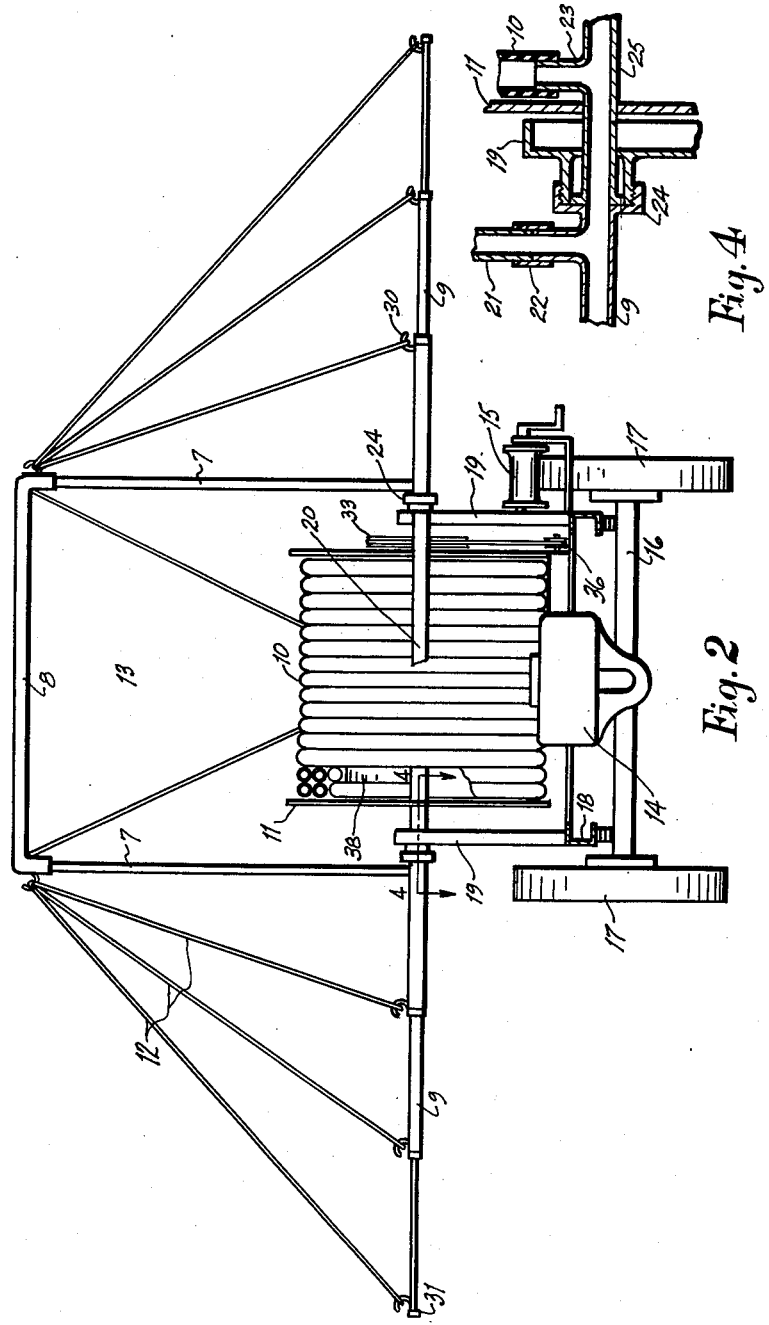
Figure 3:
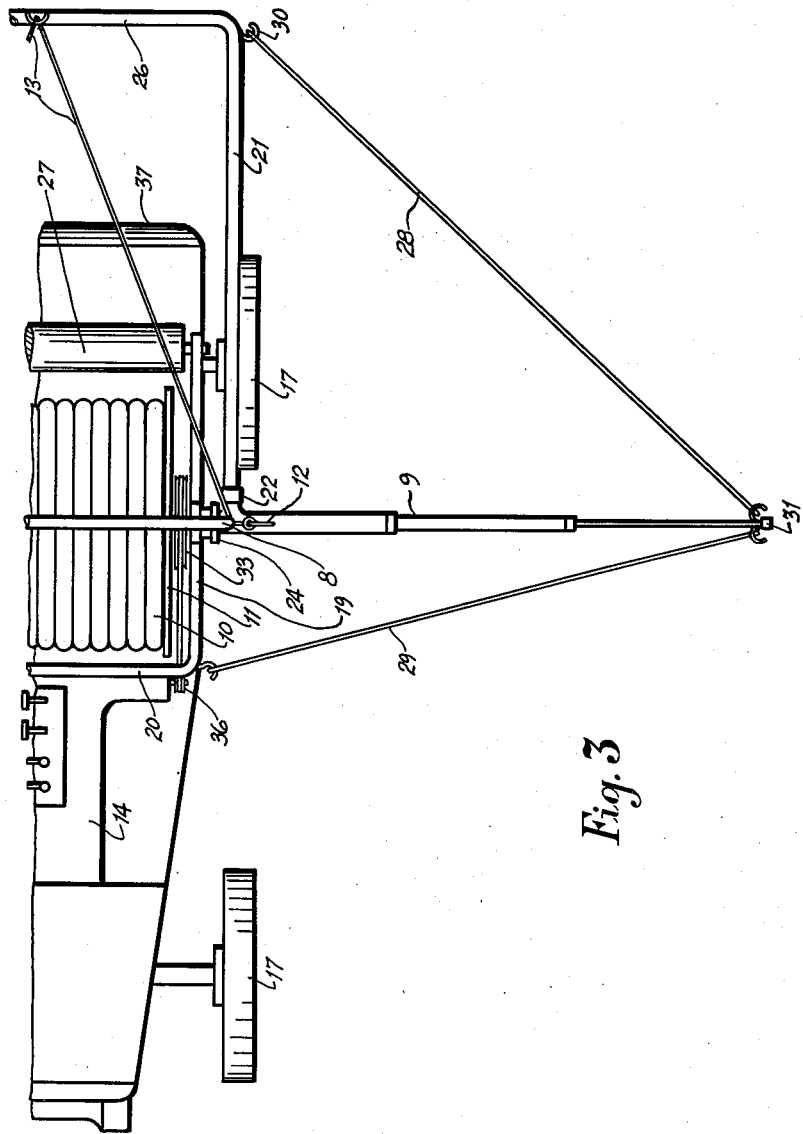

Figure 1 is a side elevation of the machine; Figure 2, a cross section through the vehicle forward of the water carrying conduits; Figure 3, a half plan view of the machine; Figure 4, a section at 4—4 of Figure 2; Figure 5, a section through water supply pipe showing sprinkler's outlets; and Figure 6, a section through supply pipe showing an alternative form of sprinkler fitting.

Similar numerals refer to similar parts throughout the several views.

The chassis 18, the wheels 17 and vehicle control units 14 constitute the sprinkler's supporting truck or vehicle.

On the floor of the vehicle are mounted two upright stanchion members 7 supporting cross head member 8. On the vehicle platform is also mounted a frame 19 supporting a reel 11 on drum 38 and around which is wound a hose 10 connected at 34 to a flexible pipe 35 the latter supplying water to hose 10 from a creek or other source of water.

The reel supporting drum is operated by means of a sheave 36 driven by vehicle transmission transmitting its rotating power to the drum through belt and sheave 33 the speed of which is controlled by speed of sheave 36. Numerals 32 and 37 show the vehicle rear platform floor, and 27 is a hose idler roller. Numeral 16 is the rear axle housing, and 20 is a reel guard.

It should be noticed here that the hose reel pipe shaft 25 is hollow. I will explain why later. To the shaft 25 are connected water supply pipe assembly 9 in three graduated sizes. Those pipes are perforated as shown at 40 Figure 5 and through which water is sprayed in two directions as shown at 39. Numeral 21 is a pipe connected to the main hose and supplying water to sprinkler pipe 26 located at the rear of the vehicle and transversely thereof.

As will readily be seen by an inspection of the drawings, pipes 9 and pipes 21 and 26 are braced horizontally by wires 28 and 29, and braced vertically by wires 12 hooked at 30. The rear sprinkling pipe 26 is braced by wires 13 tied to cross head 8. Numeral 31 is the cap blanking off ends of water pipes 9. Numeral 15 shows a hand reel for winding bracing wires when the sprinkling pipes are taken down, the wire being simply left thereon until used again. The reel being a part of the machine permanently attached thereto.

I will now describe the elements of Figure 4 and their functions.

First of all, the hose 10 is laid flat on the ground with its inner end connected at 23 to hollow shaft 25 which in turn is connected to the sprinkling pipes 9 and 21. The water is then pumped into the hose until a required pressure, the vehicle is then backed up and the filled hose is wound on the reel 11, ready for operation. Controlling valves, not shown, are placed on the sprinkling pipes and opened when the vehicle starts ahead unrolling the hose as it goes, pressure being kept in the hose until all unrolled. The operation is started again by backing up the vehicle to a source of water when the hose is again wound on the reel.

It should be noted that the sprinkling pipe 26 is placed at the rear of the vehicle so that the latter will not be driven in the mud in its travel ahead.

Numeral 22 is a coupling jointing pipe 21 to water pipe 9, and 24 is a gland nut for water tight joint between hollow shaft and sprinkler pipes 9.

Along the sprinkling pipes and at short intervals, holes are bored at approximately 45 degrees with the horizontal through which water is sprayed in two directions as shown by Figure 5.

Figure 6 illustrates an alternative form of nozzles secured at intervals on the sprinkling pipes. This means although more expensive than the first mentioned means of spraying, is more effective by the fact that the water is thrown in all directions.

I am aware that, prior to my invention, vehicles have been made equipped with sprinklers. I, therefore, do not claim such a combination broadly, but I claim:

In an irrigating apparatus, the combination of a motor driven carriage, a drum mounted thereon and adapted to rotate with the movement of the carriage motor to which it is connected by means of sheaves united by a belt, one of said sheaves being connected directly to the vehicle motor transmission and the other to said drum, a hollow shaft on which said drum is mounted and rotating in bearings secured to the carriage body, a hose carrying water under pressure connected to said hollow shaft and adapted to be reeled on said drum, sprinkling pipes connected to said hollow shaft and extending outwardly of said carriage, said pipes decreasing in diameter towards their outer ends, upright stanchion members mounted on the floor of the carriage and a cross-head member supported by said stanchion members to which said sprinkling pipes are braced, a hand reel secured to the body of the vehicle, a lone sprinkling pipe at the rear of the carriage and extending the full width thereof and connected to said hollow shaft and held in position by braces tied to said cross-head member, and an idle roller held on the body of the carriage to guide the hose in its winding and unwinding on the drum.

JOSEPH GEORGES LIBOIRON.

REFERENCES CITED

The following references are of record in the file of this patent:

UNITED STATES PATENTS

| Number | Name | Date |
|---|---|---|
| 726,580 | Shannon | Apr. 28, 1903 |
| 849,505 | Schroedter | Apr. 9, 1907 |
| 1,000,203 | Shannon | Aug. 8, 1911 |

FOREIGN PATENTS

| Number | Country | Date |
|---|---|---|
| 294,358 | Germany | Oct. 4, 1916 |